United States Patent [19]
Coates

[11] Patent Number: 4,472,968
[45] Date of Patent: Sep. 25, 1984

[54] CAPACITIVE FLUID-GAUGING PROBES AND SYSTEMS

[75] Inventor: Terence J. Coates, Godalming, England

[73] Assignee: Smiths Industries Public Limited Company, London, England

[21] Appl. No.: 424,779

[22] Filed: Sep. 27, 1982

[30] Foreign Application Priority Data

Nov. 11, 1981 [GB] United Kingdom ............... 8134053

[51] Int. Cl.³ .................... G01F 23/26; G01R 27/22
[52] U.S. Cl. ........................... 73/304 C; 324/61 P; 324/61 R
[58] Field of Search ............... 73/304 C; 361/284; 324/61 R

[56] References Cited

U.S. PATENT DOCUMENTS

| | | | |
|---|---|---|---|
| 2,918,818 | 12/1959 | Meyer | 324/61 R X |
| 2,941,403 | 6/1960 | Steenfeld et al. | 73/304 C |
| 3,083,572 | 4/1963 | Pearson | 324/61 R X |
| 3,283,577 | 11/1966 | Schuck | 73/304 C |
| 4,212,202 | 7/1980 | Schmidt | 361/284 X |
| 4,347,741 | 9/1982 | Geiger | 73/304 C |
| 4,417,473 | 11/1983 | Tward et al. | 73/304 C |

FOREIGN PATENT DOCUMENTS

1320451  6/1973  United Kingdom ............. 73/304 C

Primary Examiner—Daniel M. Yasich
Attorney, Agent, or Firm—Pollock, Vande Sande & Priddy

[57] ABSTRACT

A fuel-gauging system has a capacitive probe comprising an outer tubular electrode and a coaxial inner electrode. The outer electrode is supplied with an alternating signal from an oscillator, the inner electrode being connected to a detector unit via a resistor. The resistor is mounted between the electrodes about midway along the length of the probe, the resistor having a value that is selected to give a substantially linear output of the probe and is at least 0.1 of the reactance of the probe, preferably being about 0.3595 of the reactance. The resistor may be connected to a phase-sensitive circuit that is controlled by a phase-shift circuit which receives the input signals to the probe and shifts their phase by 90°, so as to produce an output that is in phase with the probe output. In this case the value of the resistor is preferably 0.2178 of the probe reactance.

10 Claims, 2 Drawing Figures

CAPACITIVE FLUID-GAUGING PROBES AND SYSTEMS

BACKGROUND OF THE INVENTION

This invention relates to capacitive fluid-gauging systems.

The invention is more particularly, but not exclusively concerned with systems for gauging the contents of an aircraft fuel tank.

Capacitive fuel-gauging probes used in aircraft fuel tanks commonly have an outer tubular electrode within which extends coaxially an inner rod-like electrode. The probe is mounted vertically within the tank and is open to allow any fuel within the tank to fill the space between the electrodes, to the same height as the fuel in the tank. As the height of fuel within the probe rises and falls, with change in the quantity of fuel in the tank, the capacitance between the two electrodes varies accordingly.

A measure of the dielectric constant of the fuel is obtained so that the mass of fuel can be determined regardless of variations in dielectric constant arising from temperature change or the use of different fuels. The dielectric constant is ususally determined by means of a permittivity sensor or so-called K-cell mounted at the lower end of the probe so that it is always immersed in any fuel that may be present.

In an ideal situation the capacitance of the probe is linearly related to the height of fuel in the tank. However, in practice, the fuel in the tank does not have identical properties at different depths. Typically, a temperature gradient will exist in the fuel causing its dielectric constant to vary with height. The use of a single K-cell mounted at the bottom of the tank will not therefore provide compensation for the variations in dielectric constant throughout the fuel.

Without the use of a K-cell, the probe measures over its full height and therefore the stratifications in the fuel tend to be cancelled and the probe output is dependent on the average dielectric constant of the fuel. This results in a probe output that is related in a non-linear fashion to fuel quantity.

In an attempt to make this output more linear, that is, to achieve full-height compensation, previous arrangements have used an additional capacitor connected in series with the probe. This, however, has various disadvantages. Firstly, it is expensive to provide capacitors that have a low temperature coefficient. Secondly, capacitors are usually only available with a small number of different values. Also, capacitors have the disadvantage that they produce a large attenuation in the output of the probe.

BRIEF SUMMARY OF THE INVENTION

It is an object of the present invention to provide a capacitive fuel-gauging probe and a fluid-gauging system that can be used substantially to alleviate the above-mentioned disadvantages.

According to one aspect of the present invention there is provided a capacitive fluid-gauging system having a probe that extends within a fluid container, the probe having first and second electrodes separated from one another by a gap that is filled with fluid to a height according to the height of fluid in the container, and detector means that receives an output signal from the probe and provides an output representation in response to fluid height, the system including a resistor connected in series intermediate one of the probe electrodes and the detector means, the value of said resistor being selected to give a substantially linear output of the probe and being at least 0.1 of the reactance of the probe.

The resistor may be mounted in the container between the electrodes, substantially midway along the length of the probe. The value of the resistor may be approximately 0.3595 of the reactance of the probe. The system may include phase-sensitive means that is connected with the resistor, and phase-shift circuit means that is connected to receive input signals to the probe and to produce an output the phase of which is shifted by 90° and which thereby controls the phase-sensitive means in phase with the output from the probe. Using the phase-sensitive means, the value of the resistor may be approximately 0.2178 of the reactance of the probe.

A fuel-gauging system for an aircraft, in accordance with the present invention, will now be described, by way of example, with reference to the accompanying drawings.

DETAILED DESCRIPTION

Figure 1:
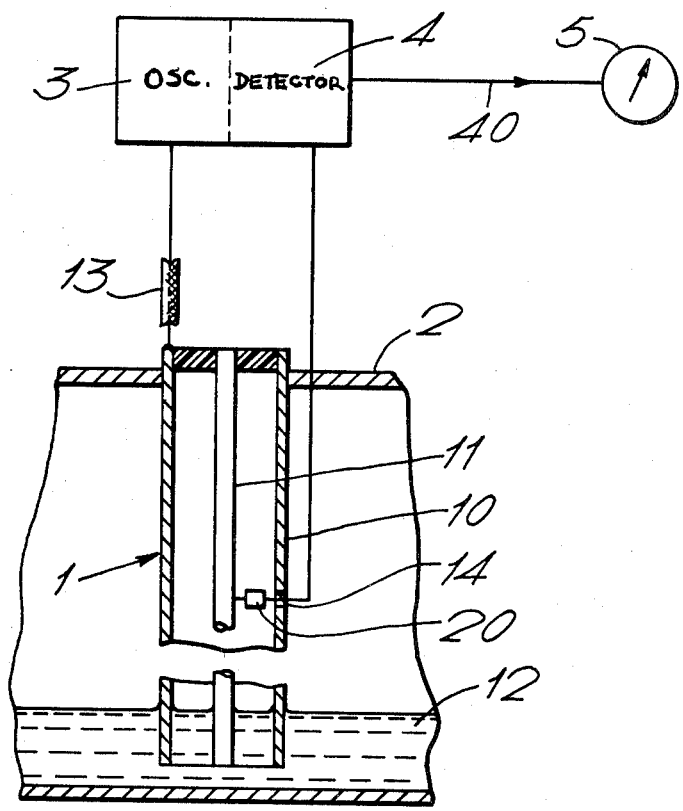
FIG. 1 is a schematic diagram of the system.

The fuel-gauging system has a probe 1 that depends vertically within an aircraft fuel tank 2. The probe 1 receives a drive signal from a supply oscillator 3, and provides an output to a detector unit 4 which in turn provides an output to an indicator 5.

The probe 1 has an outer tubular electrode 10 that is open at its lower end, and an inner coaxial rod-like electrode 11. The two electrodes 10 and 11 are separated from one another by an annular gap that is filled by fuel 12 to the same height as the fuel outside the probe. The probe may be characterized to the shape of the tank 2—so as to give a linear relationship between capacitance and fuel volume—by suitably shaping the inner electrode 11 such as by varying its diameter along its length.

The outer electrode 10 is connected with the oscillator 3 via a screened lead 13. The oscillator 3 may be of the kind described in Myers et al. U.S. patent application Ser. No. 294,950 filed Aug. 21, 1981, for "Fluid-Gauging Systems", assigned to the assignee of the instant application, and, in this respect, may be arranged to produce an alternating output in which the product of the voltage and frequency is maintained constant. Alternative forms of oscillator may also be used.

Electrical connection to the inner electrode 11 is made about midway along its length, through an aperture 14 in the outer electrode 10. Connected to the inner electrode 11, within the outer electrode, there is a low temperature coefficient resistor 20. The resistor 20 is connected in series with the inner electrode 11, intermediate the electrode and the detector unit 4.

The detector unit 4 receives the alternating output from the probe 1 and is arranged to derive from this a measure of the probe capacitance which in turn is used to provide a signal on line 40 to the indicator 5, representative of the mass of fuel in the tank 2. The detector 4 may be similar to that described in the aforementioned U.S. patent application Ser. No. 294,950.

The density p of the fuel is given by the expression:

$$p\alpha(K-1)/(1+0.4K) \quad (1)$$

where K is the dielectric constant of the fuel.

The mass of fuel is therefore given by the expression:

$$\theta = V(K-1)/(1+0.4K) \quad (2)$$

where $\theta$ is proportional to inferred fuel mass and V is the volume of fuel.

Differentiating expression (2) and multiplying by $(K-1)/\theta$ gives:

$$\frac{d\theta}{dK} \times \frac{K-1}{\theta} = 1 - \frac{0.4(K-1)}{1+0.4K} \quad (3)$$

Taking a means value of 2.1 for K, gives:

$$\frac{d\theta}{dK} \times \frac{K-1}{\theta} = 0.7609 \quad (4)$$

If we take the reactance of the probe in air as unity, and that of the resistor 20 as being R then, for a full tank:

$$\theta = V\left(\frac{1}{\sqrt{1/K^2 + R^2}} - \frac{1}{\sqrt{1+R^2}}\right) \quad (5)$$

which, when differentiated, gives:

$$\frac{d\theta}{dK} \times \frac{K-1}{\theta} = \frac{K-1}{K^3\left(\sqrt{1/K^2 + R^2} - \sqrt{\frac{(1/K^2+R^2)^3}{1+R^2}}\right)} \quad (6)$$

Equating this to expression (4) and substituting 2.1 for K gives:

$$R = 0.3595.$$

The value selected for the resistor 20 is therefore related to the reactance of the probe. With a probe having an empty capacitance of 20pF this makes the resistor 20 about 0.25MΩ at a frequency of 30 kHz. With a probe having a full capacitance of 200pF the resistance is about 2.5MΩ at a frequency of 30 kHz.

Figure 2:
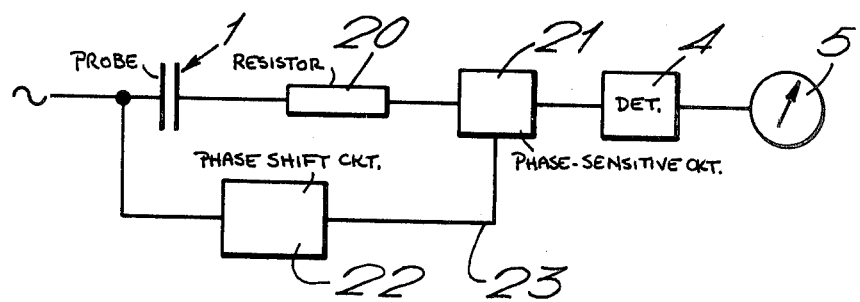
FIG. 2 shows a modification of the system of FIG. 1.

An alternative, quadrature arrangement is shown in FIG. 2. In this, the output from the resistor 20 is supplied to a phase-sensitive circuit 21. A sample of the oscillator signal is supplied to a phase-shift circuit 22 which produces an output on line 23 which has a 90° phase shift with respect to its input. The output on line 23 is therefore in phase with the output from the probe 1. This signal is used to control the phase-sensitive circuit 21.

With this quadrature arrangement, for a full tank:

$$\theta = V(K/(1+(KR)^2) - 1/(1+R^2)) \quad (7)$$

If this is differentiated and multiplied by $(K-1)/\theta$ it gives:

$$\frac{d\theta}{dK} \times \frac{K-1}{\theta} = \left(\frac{1}{1+(RK)^2} - \right. \quad (8)$$

$$\left. \frac{2K^2R^2}{(1+K^2R^2)^2}\right) \frac{K-1}{K/(1+(RK)^2) - 1/(1+R^2)}$$

Equating this to 0.7609, from expression (4), and substituting 2.1 for K gives R=0.2178 of the probe reactance.

In general therefore, the value of the series resistance is significant compared with the probe reactance, being between 0.2178 and 0.3595 for the examples given above. To achieve full height compensation in practice the resistance is at least 0.1 of the reactance of the probe.

It can be seen therefore that, with resistance 20 of the values given above, the inferred mass output of the probe will be substantially linear and without requiring the use of a series capacitor.

The series resistor 20 may be made up of several discrete resistive elements that are arranged as a current or potential divider. In this way, calibration of the probe may be achieved.

It will be appreciated that the invention is not confined to application with fuel-gauging systems but may be useful in other fluid-gauging systems.

I claim:

1. In a capacitive fluid-gauging system of the kind having a probe that extends within a fluid container, the probe having first and second electrodes separated from one another by a gap that is filled with fluid to a height according to the height of fluid in the container; oscillator means; means connecting said oscillator means with the first electrode of said probe so as to supply an alternating input signal to said probe; detector means; and means connecting said detector means to the second electrode of said probe so as to receive an output signal from said probe, said detector means providing an output representation in response to fluid height, the improvement wherein the system includes a fixed value resistor, means connecting said resistor in series intermediate said second electrode and the said detector means, the value of the resistor being at least 0.1 of the reactance of the probe and being selected to give a substantially linear output of the probe.

2. A capacitive fluid-gauging system according to claim 1, wherein said system includes means mounting said resistor in said fluid container.

3. A capacitive fluid-gauging system according to claim 1, wherein said system includes means mounting said resistor between said electrodes.

4. A capacitive fluid-gauging system according to claim 1, wherein the system includes means mounting said resistor substantially midway along the length of said probe.

5. A capacitive fluid-gauging system according to claim 1, wherein said first electrode is of a tubular shape, and wherein said second electrode extends axially within said first electrode.

6. A capacitive fluid-gauging system according to claim 1, wherein the value of said resistor is approximately 0.3595 of the reactance of said probe.

7. A capacitive fluid-gauging system according to claim 1, wherein the system includes phase-sensitive means, means connecting said phase-sensitive means with said resistor so as to receive the output from said resistor, phase-shift circuit means, means connecting an input of said phase-shift circuit means to said oscillator means so as to receive said alternating signal and to produce an output signal that is shifted by 90° with respect to said alternating signal and that is thereby in phase with the said output signal from said probe, means connecting the output of said phase-shift circuit to the phase-sensitive means such as to control said phase-sensitive means in phase with the output from said probe, and means connecting said phase-sensitive means to said detector means.

8. A capacitive fluid-gauging system according to claim 7, wherein the value of said resistor is approximately 0.2178 of the reactance of said probe.

9. A capacitive fluid-gauging system having a probe that extends within a fluid container, said probe having first and second electrodes separated by a gap that is filled with fluid to a height according to the height of fluid in the container; oscillator means; means connecting said oscillator means with said first electrode so as to supply an alternating input signal to said probe; detector means that is connected to said second electrode so as to receive an output signal from said probe, said detector means providing an output representation in response to fluid height, a fixed value resistor connected in series between said second electrode and the said detector means; and means mounting said resistor on said probe within said container, the value of said resistor being approximately 0.3595 of the reactance of the probe.

10. A capacitive fluid-gauging system having a probe that extends within a fluid container, said probe having first and second electrodes separated by a gap that is filled with fluid to a height according to the height of fluid in the container; a resistor having a fixed value of approximately 0.2178 of the reactance of said probe; means mounting said resistor on said probe within said container; means connecting said resistor with said second electrode; phase-shift circuit means arranged to provide an output signal that is shifted by 90° with respect to its input; oscillator means; means connecting said oscillator means with the first electrode of said probe so as to supply an alternating input signal to said probe; means connecting said oscillator means with the input of said phase-shift circuit means so as to supply an alternating input signal to said phase-shift circuit; phase-sensitive means connected in series with said resistor; means connecting the output of said phase-shift circuit means to said phase-sensitive means so as to control said phase-sensitive means in phase with the output from said probe; detector means; and means connecting said detector means to said phase sensitive means to receive an output from said probe, said detector means providing an output representation in response to fluid height.

* * * * *